United States Patent [19]

Bouché

[11] Patent Number: 5,626,453
[45] Date of Patent: May 6, 1997

[54] STORAGE SYSTEM HAVING LOAD-BEARING ELEMENTS AND AN APPARATUS FOR LOADING AND UNLOADING THE LATTER

[75] Inventor: Norbert Bouché, Kuhardt, Germany

[73] Assignee: Bellheimer Metallwerk GmbH, Pfalz, Germany

[21] Appl. No.: 406,963

[22] Filed: Mar. 28, 1995

[30] Foreign Application Priority Data

Oct. 2, 1992 [DE] Germany .................. 42 33 690.2

[51] Int. Cl.⁶ .................................................. B65G 1/04
[52] U.S. Cl. ................ 414/280; 198/803.01; 414/286
[58] Field of Search .............................. 414/280, 286; 198/803.01, 435, 465.1

[56] References Cited

U.S. PATENT DOCUMENTS 3,877,386  4/1975  Wakabayashi .................. 198/465.1
3,951,277  4/1976  Hegelman ........................ 414/280
4,556,355  12/1985  Glater ............................. 414/280
4,901,840  2/1990  Babel ........................... 198/465.1
5,024,571  6/1991  Shahar et al. .................. 414/280

FOREIGN PATENT DOCUMENTS 461735    12/1991  European Pat. Off. .
3624003   8/1987   Germany .
9213979   12/1992  Germany .
8103653   12/1981  WIPO .

Primary Examiner—Thomas J. Brahan
Attorney, Agent, or Firm—Mark P. Stone

[57] ABSTRACT

An apparatus for loading and unloading load-bearing elements onto and off shelving is designed so that the load bearing elements are driven by carriers which have a cam contour, designed and matched to abutments, in the form of recesses, so that the load-bearing elements can be precisely positioned in the shelving.

5 Claims, 1 Drawing Sheet

STORAGE SYSTEM HAVING LOAD-BEARING ELEMENTS AND AN APPARATUS FOR LOADING AND UNLOADING THE LATTER

The invention relates to a storage system having load-bearing elements and an apparatus for loading and unloading the load-bearing elements onto and off shelving, in which the load-bearing elements are provided at their mutually opposing ends with abutments for carriers and in which the loading and unloading of the load-bearing elements is served by carriers driven by rotating drive strands and disposed in mutually offset arrangement in the drive strand direction, which carriers, under jolt-free forced guidance, interact with mutually opposing walls of the abutments for the purpose of transporting the load-bearing elements.

An apparatus of the above type is known from EP-A-461,735. In the known apparatus, the driving of respectively two carriers exhibiting a circular cross section is served by drive strands, which respectively pass four deflection pulleys having vertical axes. The use of four deflection pulleys in each case enables the creation, between two respective, pulleys facing a load-bearing element, of a straight strand portion, which runs parallel to the front edge of the load-bearing element and allows a rectilinear entry of a respective vertically disposed carrier into a guide slot provided on the load-bearing element, the width of which guide slot is equal to the diameter of the carriers, thereby ensuring a jolt-free forced guidance of the load-bearing elements. Since, for the guidance of the drive strands, four pulleys are respectively required, not only is the manufacturing complexity for the known construction relatively great, but also the spatial requirement for the drive strands and pulleys.

In another apparatus, known from U.S. Pat. No. 4,756,657, for loading and unloading load-bearing elements onto and off shelving, the drive strands pass only two deflection pulleys. Here too, the carriers are cylindrically configured. The disadvantage of this apparatus consists in the fact that the load-bearing elements, as they are loaded onto the shelving, at the end of the loading operation, are not forcibly braked by the carriers over a predefined path distance, but, in the state of having been released by the carriers, cover path distances of greater or lesser length until coming to rest. The result is that their end position is not precisely defined unless stops are employed which fix an end position. This latter means no more nor less however than that the speed is abruptly reduced to zero.

The object of the invention is to provide a storage system of the considered generic type, in which a forced guidance of the load-bearing elements is also possible where the drive strands for the carriers no longer pass deflection pulleys as in the case of the second known apparatus. This object is achieved according to the invention by virtue of the fact that the carriers are connected at two respective, mutually spaced points to the drive strands, and that the jolt-free forced guidance of the load-bearing elements into their respective end position is secured by a cam profile of the carriers, the drive strands passing, at the mutually opposing ends of the apparatus, only one respective deflection pulley.

The storage system according to the invention offers the advantage that, in its case, the load-bearing elements are transferred into the shelving compartments in a jolt-free manner into their precise end position and, upon being unloaded, are accelerated in a jolt-free manner, without the need for a complex and bulky guidance of the drive strands.

BRIEF DESCRIPTIONS OF THE DRAWINGS

Drawing FIGS. 1–10 show the ten positions of the drive strand and the carriers connected thereto.

DETAILED DESCRIPTION OF THE BEST MODE FOR CARRYING OUT THE INVENTION

Figure 1:
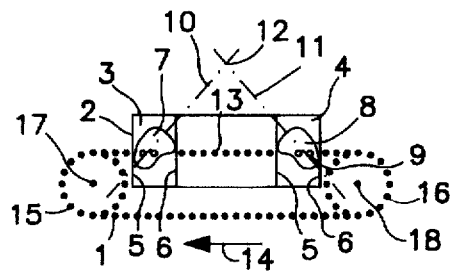
Figure 2:
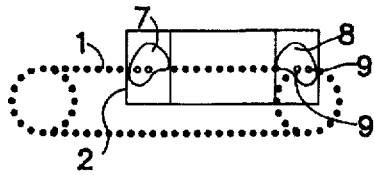
Figure 3:
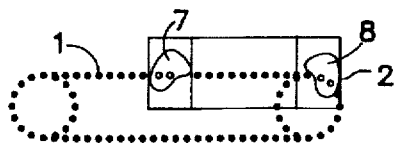
Figure 4:
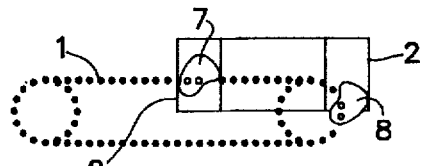
Figure 5:
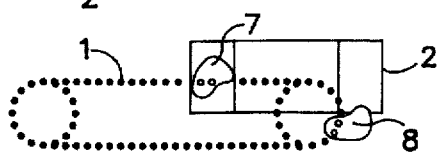
Figure 6:
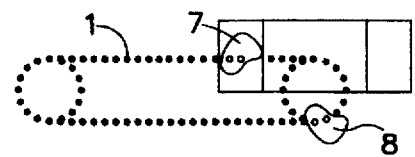
Figure 7:
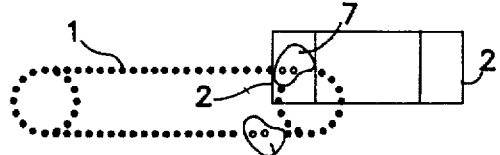
Figure 8:
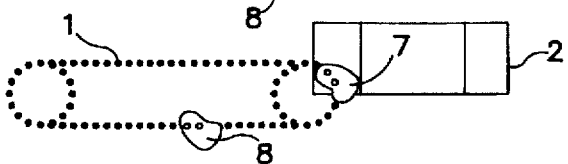
Figure 9:
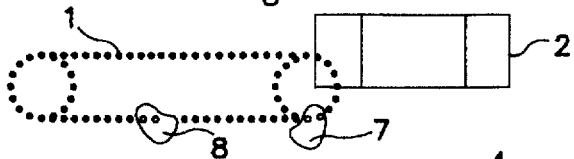
Figure 10:
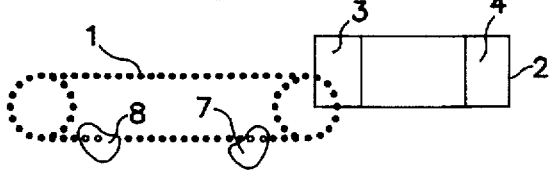

The invention is explained in greater detail below with reference to the appended diagrammatic drawing. FIGS. 1–10, which illustrate an operating sequence of a storage system in accordance with the present invention showing movement of load-bearing elements during different phases of a loading and unloading procedure.

In referring to FIGS. 1–10, 1 is one of two mutually spaced drive strands of an apparatus for shifting load-bearing elements 2 to and fro, which apparatus can be moved up and down in front of a shelving disposed perpendicular to the plane of projection. Each load-bearing element 2 exhibits at its ends abutments, which are formed by receiving recesses 3 and 4 having respectively mutually opposing walls 5 and 6 and into which, during transportation of the load-bearing elements 2, carriers 7 and 8 reach with a cam-shaped profile. The carriers 7 and 8 are fastened to two respective, immediately consecutive chain pins 9 of the drive strand 1 respectively assigned to them and formed by a chain. Naturally, the apparatus is additionally provided with supporting rails for the respective load-bearing element and with means for its guidance and propulsion. Since these means, however, have nothing to do with the core of the invention and, moreover, are known, they have not here been represented. The drawings further illustrate a pair of opposed deflection pulleys 15 and 16, having an axes 17 and 18, respectively. As illustrated by the drawings, the distance between the points at which the carriers 7 and 8 are connected to the drive strand 1 is less than the distance between the axes 17 and 18 of the opposed deflection pulleys 15 and 16.

The drawings show 10 positions of the drive strand 1 and of the carriers 7 and 8 connected thereto. In the position shown in FIG. 1, the carriers 7 and 8 bear against the respectively outer walls 5 and 6 of the receiving recesses 3 and 4 and thereby detain the load-bearing elements 2 in a specific position. A detention of this type could also be realized using cylindrical carriers, although the diameter of such carriers would have to be less than the distance between the mutually opposing walls 5 and 6 of the receiving recesses 3 and 4, which would once again dictate against a controlled braking and accurate positioning of the load-bearing element 2 during loading. As can be seen with reference to position shown in FIG. 1, the carriers 7 and 8 are connected to the drive strand 1 in such a way that their longitudinal axes 10 and 11, when a load-bearing element is detained on the apparatus, intersect at the apex 12 of an isosceles triangle, the base line of which is formed by that part 13 of the drive strand which is disposed between the carriers 7 and 8.

When the respective load-bearing element 2 is loaded onto the shelving, a motion in the direction of the arrow 14 is induced in the drive strand 1 and the load-bearing element 2 is shifted to the right from its starting position. The positions of FIGS. 2 to 7 show different insertion phases. In the passage between the positions of FIGS. 7 and 8, the load-bearing element 2, which, in the position shown in FIG. 8, has already reached its precise end position, is braked in a controlled manner, and this without any disturbing shock loads either upon the shelving or upon the load-bearing element. The end position of the drive strand 1 and of the carriers 7 and 8 is represented, on the other hand, in the position shown in FIG. 10. The carriers 7, 8 can either be returned from the end position into the position shown in FIG. 1 or, indeed, can remain initially in the end position so as then to unload a load-bearing element from another shelving compartment, by inducing in the drive strand 1 a motion running counter to the arrow 14.

I claim:

1. A storage system comprising load-bearing elements and an apparatus for loading and unloading load-bearing elements onto and off of shelving; said load-bearing elements being provided at their mutually opposing ends with abutments for carriers; said loading and unloading of the load-bearing elements being performed by carriers driven by rotating drive strands and disposed in mutually offset arrangement in the direction of said drive strands; said carriers, under jolt-free forced guidance, interacting with mutually opposing walls of the abutments for transporting the load-bearing elements; wherein the carriers (7, 8) are connected at two respective, mutually spaced points to the drive strands (1); wherein the jolt-free forced guidance of the load-bearing elements (2) into their respective end positions is secured by a cam profile of the carriers (7, 8); wherein the drive strands (1) pass only one respective deflection pulley at each of the mutually opposing ends of the apparatus; and wherein the carriers (7, 8) have longitudinal axes (10, 11), said longitudinal axes, when a load-bearing element (2) is unloaded off of shelving and is carried on said apparatus in at least one position on said drive strand between said opposing ends of said apparatus, form the sides of an isosceles triangle having as its base line a part (13) of the drive strand (1) which interconnects the carriers (7, 8).

2. The apparatus as claimed in claim 1, wherein the drive strands (1) are formed by chains comprising chain pins (9) and the carriers (7, 8) are connected to two respective, immediately consecutive chain pins (9) of the chains.

3. A storage system comprising load-bearing elements and an apparatus for loading and unloading load-bearing elements onto and off of shelving; said load-bearing elements being provided at their mutually opposing ends with abutments for carriers driven by two mutually spaced rotating drive strands and disposed in mutually offset arrangement in the direction of said drive strands; said loading and unloading of the load-bearing elements being performed exclusively by said carriers; said drive strands passing deflection pulleys at each of their opposing ends; said carriers, under jolt-free forced guidance, interacting with mutually opposing walls of the abutments for transporting the load-bearing elements; wherein the carriers (7, 8) are connected at two respective, mutually spaced points to the drive strands (1), the distance between said points being less than the distance between the axes of the deflection pulleys; wherein the jolt-free forced guidance of the load-bearing elements (2) into their respective end positions is secured by a cam profile of the carriers (7, 8); wherein the drive strands (1) pass only one deflection pulley at each of the mutually opposing ends of the apparatus; and wherein said carriers (7, 8) each are in contact with said opposing walls (5, 6) of said abutments, when a load-bearing element (2) is unloaded off of shelving and is carried on said apparatus in at least one position between said deflection pulleys.

4. The apparatus as claimed in claim 3, wherein the drive strands (1) are formed by chains comprising chain pins (9) and carriers (7, 8) are connected to two respective, immediately consecutive chain pins (9) of the chains.

5. The apparatus as claimed in claim 3, wherein the carriers (7, 8) have longitudinal axes (10, 11), said longitudinal axis, when a load-bearing element (2) is unloaded off of shelving and is carried on said apparatus in said at least one position between said deflection pulleys, form the sides of an isosceles triangle having as its base line a part (13) of the drive strand (1) which interconnects the carriers (7, 8).

\* \* \* \* \*

UNITED STATES PATENT AND TRADEMARK OFFICE
CERTIFICATE OF CORRECTION

PATENT NO. : 5,626,453
DATED : May 6, 1997
INVENTOR(S) : Norbert Bouche

It is certified that error appears in the above-identified patent and that said Letters Patent is hereby corrected as shown below:

Add the following to the cover page of the patent:

[22] PCT Filed: October 1, 1993

[86] PCT No.: PCT/DE93/00951

Sec. 371 Date: March 28, 1995

Sec 102(e) Date: March 28, 1995

[87] PCT Pub. No.: WO/94/07775

PCT Pub. Date: April 14, 1994

Signed and Sealed this

Twenty-ninth Day of July, 1997

*Attest:*

BRUCE LEHMAN

*Attesting Officer*  *Commissioner of Patents and Trademarks*